United States Patent
Wang et al.

(10) Patent No.: US 11,334,201 B2
(45) Date of Patent: May 17, 2022

(54) TOUCH PEN INCLUDING SENSING UNITS ARRANGED IN ARRAY AND METHOD FOR CONTROLLING THE SAME, TOUCH CONTROL DEVICE AND READABLE STORAGE MEDIUM

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Meng Wang, Beijing (CN); Zhixiang Fang, Beijing (CN); Guanglei Yang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 16/862,161

(22) Filed: Apr. 29, 2020

(65) Prior Publication Data
US 2021/0124456 A1 Apr. 29, 2021

(30) Foreign Application Priority Data
Oct. 25, 2019 (CN) .......................... 201911025894.9

(51) Int. Cl.
*G06F 3/044* (2006.01)
*G06F 3/0354* (2013.01)
*G06F 3/041* (2006.01)

(52) U.S. Cl.
CPC ........ *G06F 3/0442* (2019.05); *G06F 3/03545* (2013.01); *G06F 3/04162* (2019.05)

(58) Field of Classification Search
CPC . G06F 3/0442; G06F 3/03545; G06F 3/04162
See application file for complete search history.

(56) References Cited

U.S. PATENT DOCUMENTS

| | | | |
|---|---|---|---|
| 5,248,855 A * | 9/1993 | Cambridge | ......... G06F 3/03545 178/19.01 |
| 9,146,649 B1 * | 9/2015 | Chang | ...................... G06F 3/033 |
| 2009/0148224 A1 * | 6/2009 | Steiger | .................. B05B 7/2459 401/198 |
| 2014/0092069 A1 * | 4/2014 | Bentov | ..................... G06F 1/26 345/179 |

* cited by examiner

*Primary Examiner* — Kwang-Su Yang
(74) *Attorney, Agent, or Firm* — Brooks Kushman P.C.

(57) ABSTRACT

A touch pen, a method for controlling the same, a touch control device and a readable storage medium are provided. The touch pen includes: a pen body; and a first controller, a touch sensing circuit and an accommodation part that are arranged on the pen body. The accommodation part is configured to accommodate a fluid, and is coupled to the touch sensing circuit. The touch sensing circuit is configured to contact the fluid in the accommodation part in a case that the pen body is in an inclined posture, detect position information of the fluid in contact with the touch sensing circuit and determine a corresponding reference value based on the position information. The first controller is coupled to the touch sensing circuit, and is configured to output a control signal according to the reference value.

17 Claims, 6 Drawing Sheets

TOUCH PEN INCLUDING SENSING UNITS ARRANGED IN ARRAY AND METHOD FOR CONTROLLING THE SAME, TOUCH CONTROL DEVICE AND READABLE STORAGE MEDIUM

CROSS-REFERENCE TO RELATED APPLICATION

This application claims priority to Chinese Patent Application No. 201911025894.9 filed on Oct. 25, 2019, which is incorporated herein by reference in its entirety.

TECHNICAL FIELD

The present disclosure relates to the technical field of touch display, in particular to a touch pen, a method for controlling the same, a touch control device, and a readable storage medium.

BACKGROUND

With the development of touch control technology, more and more terminals perform human-computer interaction based on touch control. Touch control methods generally include touching by a human hand or touching by a touch pen. Touch pens are divided into passive touch pen and active touch pen. The passive touch pen has the same principle as hand touch. The active touch pen emits an excitation signal via a pen tip, so that a coupling capacitance is generated between the pen tip and a screen sensor, and then the terminal is enabled to detect touch point coordinates.

SUMMARY

In a first aspect, some embodiments of the present disclosure provide a touch pen, which includes: a pen body, and a first controller, a touch sensing circuit, and an accommodation part provided on the pen body. The accommodation part is configured to accommodate a fluid, and is coupled to the touch sensing circuit; the touch sensing circuit is configured to contact the fluid in the accommodation part in a case that the pen body is in an inclined posture, detect position information of the fluid in contact with the touch sensing circuit and determine a corresponding reference value based on the position information; and the first controller is coupled to the touch sensing circuit, and is configured to output a control signal according to the reference value.

In a second aspect, some embodiments of the present disclosure provide a touch control device, which includes a first device and the touch pen provided in the above embodiments. The first device is configured to receive the control signal outputted by the first controller of the touch pen.

In a third aspect, some embodiments of the present disclosure provide a method for controlling a touch pen, which is applied to the touch pen provided in the foregoing embodiments, which includes: determining a reference value based on position information of the fluid contacting the touch sensing circuit; and outputting a control signal according to the reference value.

In a fourth aspect, some embodiments of the present disclosure provide a readable storage medium that stores a computer program. The computer program is executed by the touch pen to implement the method for controlling the touch pen provided by the above embodiments of the present disclosure.

Additional aspects and advantages of the present disclosure will be partially given in the following description, which will become apparent from the following description or will be learned through the practice for the present disclosure.

BRIEF DESCRIPTION OF THE DRAWINGS

The above and/or additional aspects and advantages of the present disclosure will become apparent and will be easily understood from the following description of the embodiments in conjunction with the accompanying drawings.

DETAILED DESCRIPTION

Figure 1:
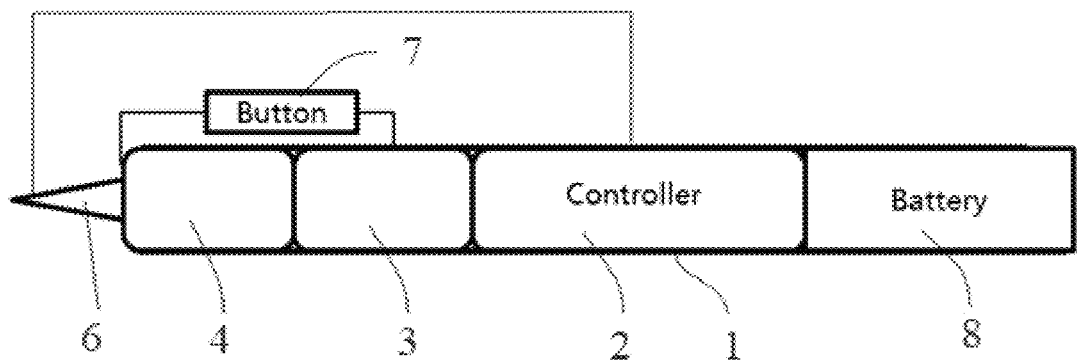
FIG. 1 is a schematic structural diagram of a touch pen provided by some embodiments of the present disclosure.

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they may be omitted. The embodiments described below with reference to the drawings are exemplary and only used to explain the present disclosure, and cannot be construed as limiting the present disclosure.

It will be understood by a person of ordinary skill in the art that, unless otherwise defined, all terms (including technical and scientific terms) used herein have the same meaning as commonly understood by a person of ordinary skill in the art to which this disclosure belongs. It should also be understood that terms such as those defined in the general dictionary should be understood to have meanings consistent with the meanings in the context of the related technologies, and unless specifically defined herein, they would not be explained by idealized or overly formal meanings.

A person of ordinary skill in the art will understand that, unless specifically stated, singular forms such as "a", "an" and "the" may include plural forms. It should be further understood that such a term as "include", or "comprise" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the other element, or an intervening element may also be present. Furthermore, terms such as "connected" or "coupled" as used herein may include wireless connection or wireless coupling. The term "and/or" as used herein includes all or any of or all combinations of one or more of associated items as listed.

The technical solutions of the present disclosure and how to solve the above technical problems based on the technical solutions of the present disclosure solve are specifically described hereinafter with specific embodiments.

A touch pen can generally achieve corresponding functions by detecting an inclined angle of the touch pen. A touch pen in the related technology usually emits an excitation signal via a pen tip, so that a coupling capacitance is generated between the pen tip and a sensor on a screen, and a touch point coordinate is detected. A pressure sensor or Bluetooth module is adopted to detect the inclined angle of the touch pen. However, the pressure sensor and Bluetooth module are relatively expensive and consume large power, which increases the cost of using the touch pen.

To address the situation in the related technology that the need for a pressure sensor or a Bluetooth module by the touch pen leads to higher price or higher power consumption, some embodiments of the present disclosure provide a touch pen, a method for controlling the same, a touch control device and a readable storage medium.

Figure 2:
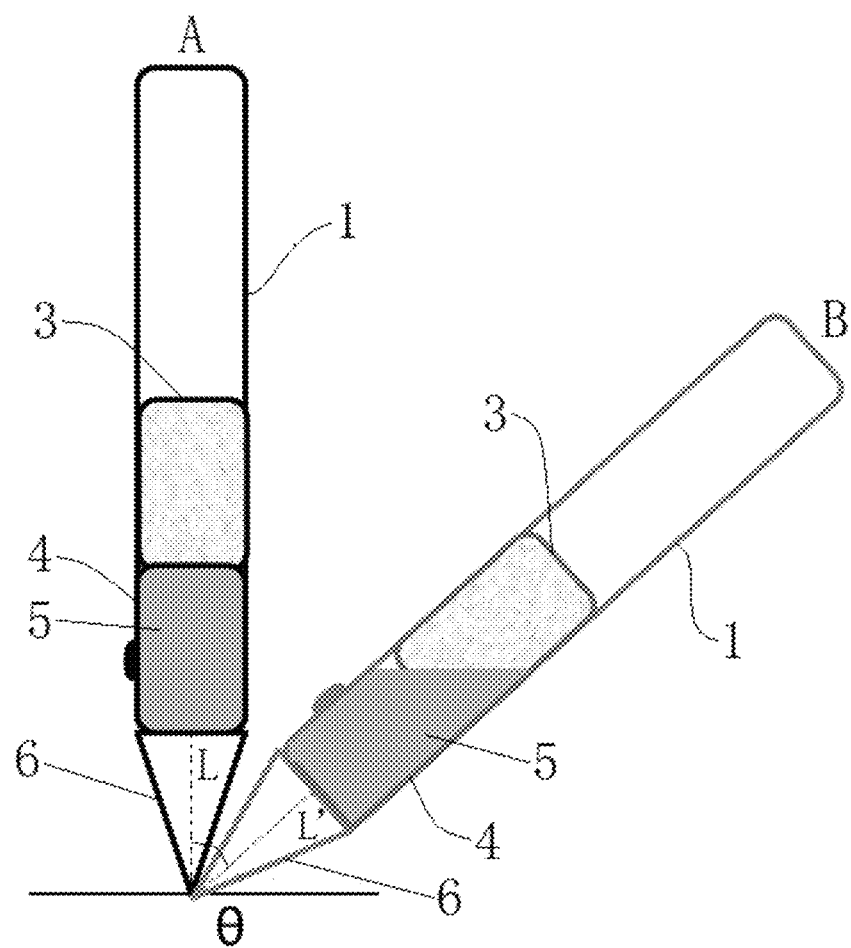
FIG. 2 is a schematic diagram of a use process of a touch pen provided by some embodiments of the present disclosure, which is a perspective view, and a controller and a power supply part are omitted.

Some embodiments of the present disclosure provide a touch pen. As shown in FIG. 1 and FIG. 2, the touch pen includes a pen body 1, and a first controller 2, a touch sensing circuit 3 and an accommodation part 4 that are arranged on the pen body 1.

The accommodation part 4 accommodates a fluid 5, and is in communication with the touch sensing circuit 3. In a case that the pen body 1 is in an inclined posture, the fluid 5 in the accommodation part 4 can flow to contact the touch sensing circuit 3.

The touch sensing circuit 3 is configured to contact the fluid 5 in a case that the pen body 1 is in an inclined posture, and output a corresponding reference value based on position information of the touch sensing circuit 3 in contact with the fluid 5.

The first controller 2 is coupled to the touch sensing circuit 3 and configured to output a control signal according to the reference value.

It should be noted that the pen body 1, the first controller 2, the touch sensing circuit 3 and the accommodation part 4 may be mutually independent components, and the pen body 1 is only configured to carry the first controller 2, the touch sensing circuit 3 and the accommodation part 4. Optionally, at least one of the first controller 2, the touch sensing circuit 3 or the accommodation part 4 may belong to a partial area of the pen body 1.

In some embodiments, as shown in FIG. 1, the first controller 2 may include a boost circuit.

When the touch pen is inclined, the fluid 5 in the accommodation part 4 may flow into the touch sensing circuit 3, and the touch sensing circuit 3 may output a corresponding reference value based on the position information the touch sensing circuit 3 in contact with the fluid 5. When the touch pen is in a different inclined posture, the amount of the fluid 5 flowing into the touch sensing circuit 3 may change, so that the position information of the touch sensing circuit 3 in contact with the fluid 5 and the reference value outputted by the touch sensing circuit 3 may also change accordingly. Since the first controller 2 can output corresponding signals according to different reference values, the first controller 2 of the touch pen can change the outputted signal with the only need of the user to change the inclined posture of the touch pen, thereby realizing related control functions. The touch sensing circuit 3 of the touch pen replaces the pressure sensor and the Bluetooth module of touch pens in the related technology. The touch pen in the embodiments of the present disclosure has a simpler structure and a faster response speed, which not only saves the cost but also reduces power consumption.

Taking FIG. 2 as an example, the touch pen is in a vertical state at position A, the inclined angle is 0, and the touch sensing circuit 3 is not in contact with the fluid 5. The touch pen is inclined rightwards from position A to position B, in this case, the touch pen is in an inclined posture with an inclined angle of θ, and a part of the touch sensing circuit 3 is in contact with the fluid 5 so that a corresponding reference value is outputted.

In the embodiments of the present disclosure, the vertical state of the touch pen may refer to that a central axis of the touch pen is parallel or substantially parallel to the direction of gravity; in this case, the inclined angle of the touch pen is 0.

It should be noted that both the dotted line L and the dotted line L' in FIG. 2 represent the central axis of the pen body 1. In the embodiments of the present disclosure, the inclined angle of the touch pen at a current position refers to an angle between the central axis L' of the touch pen at the current position and the central axis L of the touch pen at position A. For example, the inclined angle θ is the angle between the central axis L' of the touch pen at position B and the central axis L of the touch pen at position A.

When the touch pen is inclined rightwards from position A to position B, a position of the touch sensing circuit 3 in contact with the fluid 5 may change at least for one time, and each position corresponds to one reference value.

Figure 3:
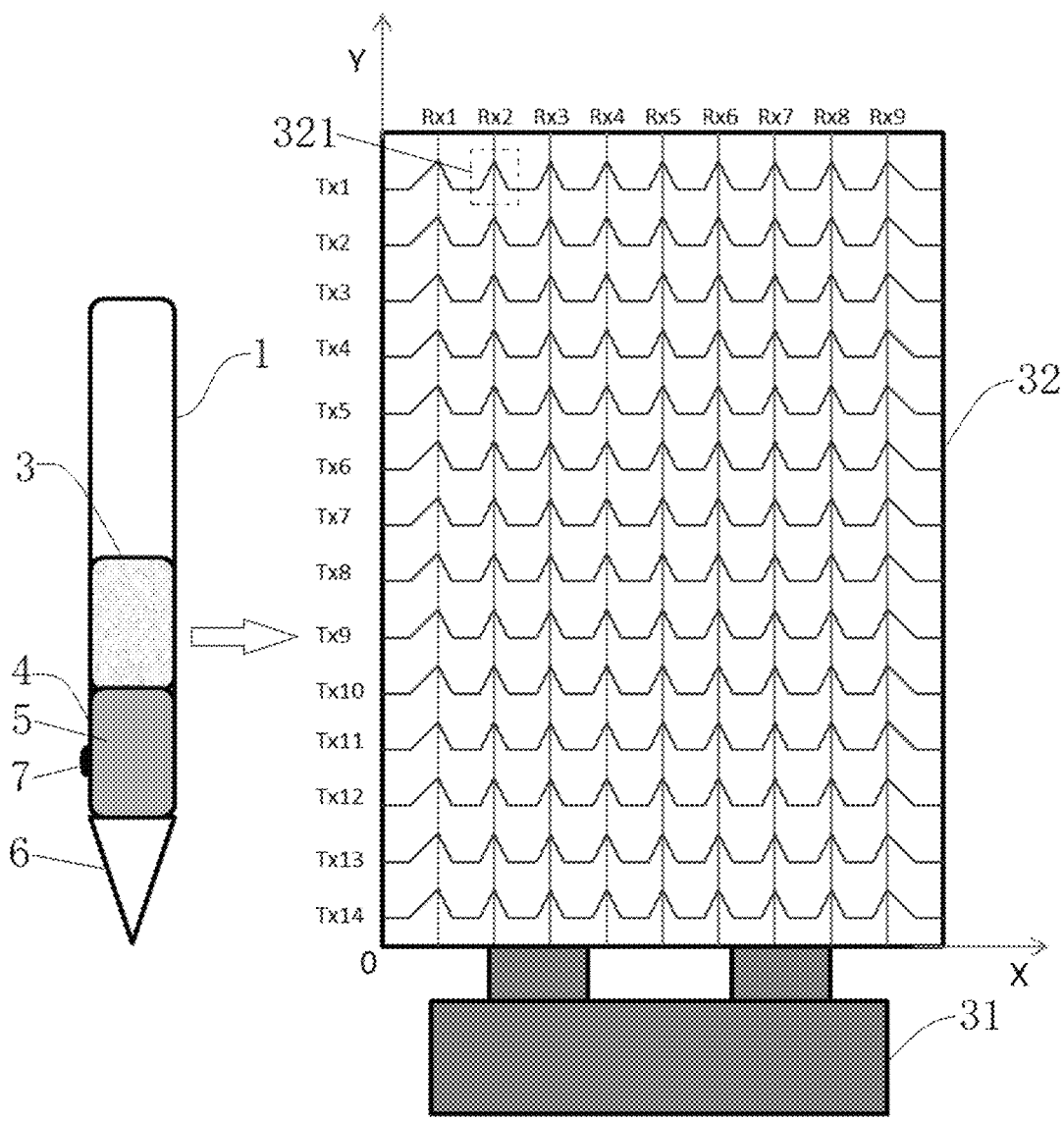
FIG. 3 is a schematic diagram showing a touch pen in a vertical state and a touch sensing circuit provided by some embodiments of the present disclosure.

In an embodiment of the present disclosure, as shown in FIG. 3, the touch sensing circuit 3 includes a touch detection sub-circuit 31 and a touch sensor 32. The touch sensor 32 is adjacent to the accommodation part 4 and is configured to contact the fluid 5 when the pen body 1 is in an inclined posture. The touch detection sub-circuit 31 is coupled to the first controller 2 and the touch sensor 32, and is configured to output a corresponding reference value to the first controller 2 according to the position information of the touch sensor 32 in contact with the fluid 5.

The touch sensor 32 can be based on the principle of capacitive touch sensing or resistive touch sensing. When the touch pen is inclined, the fluid 5 in the accommodation part 4 flows into the touch sensing circuit 3 and contacts the corresponding position of the touch sensor 32. A current or a resistance of the sensor 32 at the corresponding position changes, and then the touch sensor 32 outputs a corresponding current. The touch sensing circuit 3 may detect the current outputted by the touch sensor 32, determine the position information of the touch sensing circuit 3 contacting the fluid 5, and determine the corresponding reference value. When the touch pen is in a different inclined posture, the amount of the fluid 5 flowing into the touch sensing circuit 3 may change, so that the position information of the touch sensor 32 in contact with the fluid 5, a current outputted by the touch sensor 32, and a reference value outputted by the touch detection circuit 31 may also change accordingly.

In some optional embodiments of the present disclosure, as shown in FIG. 3, the touch sensor 32 has a sensing unit array. The touch detection sub-circuit 31 is coupled to each sensing unit 321 in the sensing unit array through a signal line, and is configured to detect position coordinates of all the sensing unit(s) in contact with the fluid 5 and output a corresponding reference value to the first controller 2 according to position(s) of the sensing unit(s) 321 in contact with the fluid 5.

It should be noted that the range of the sensing unit 321 indicated by the dotted box in FIG. 3 does not represent the actual range of the sensing unit 321, but is only for the convenience of the reader to more clearly understand the arrangement manner of the sensing unit 321 shown in FIG. 3. The number and arrangement of the sensing units 321 can be determined in accordance with actual design requirements.

Optionally, the plurality of sensing units 321 is sequentially arranged at intervals along a certain direction (such as a direction parallel to the central axis of the pen body 1).

Optionally, the plurality of sensing units 321 is arranged in a matrix.

When the touch pen is inclined, the fluid 5 in the accommodation part 4 flows into the touch sensing circuit 3 and contacts at least one sensing unit 321 at a corresponding position of the touch sensor 32, the touch sensor 32 outputs a corresponding current, and the touch detection sub-circuit 31 can detect the current outputted by the touch sensor 32, determine position information of a sensing unit 321 contacting the fluid 5 and output the corresponding reference value. When the touch pen is in a different inclined posture, the amount of the fluid 5 flowing into the touch sensing circuit 3 may change, and the fluid 5 may contact sensing units 321 at different positions, thus the current outputted by the touch sensor 32 and the reference value outputted by the touch detection sub-circuit 31 also change accordingly.

Optionally, the touch detection sub-circuit 31 outputs the corresponding reference value to the first controller 2 based on position information of the farthest sensing unit 321 contacting the fluid 5. The farthest sensing unit herein refers to a sensing unit that is the farthest from the pen tip part or the accommodation part among all the sensing units 321 contacting the fluid 5, as shown the sensing unit 321 indicated by a dashed box in FIG. 4.

Figure 4:
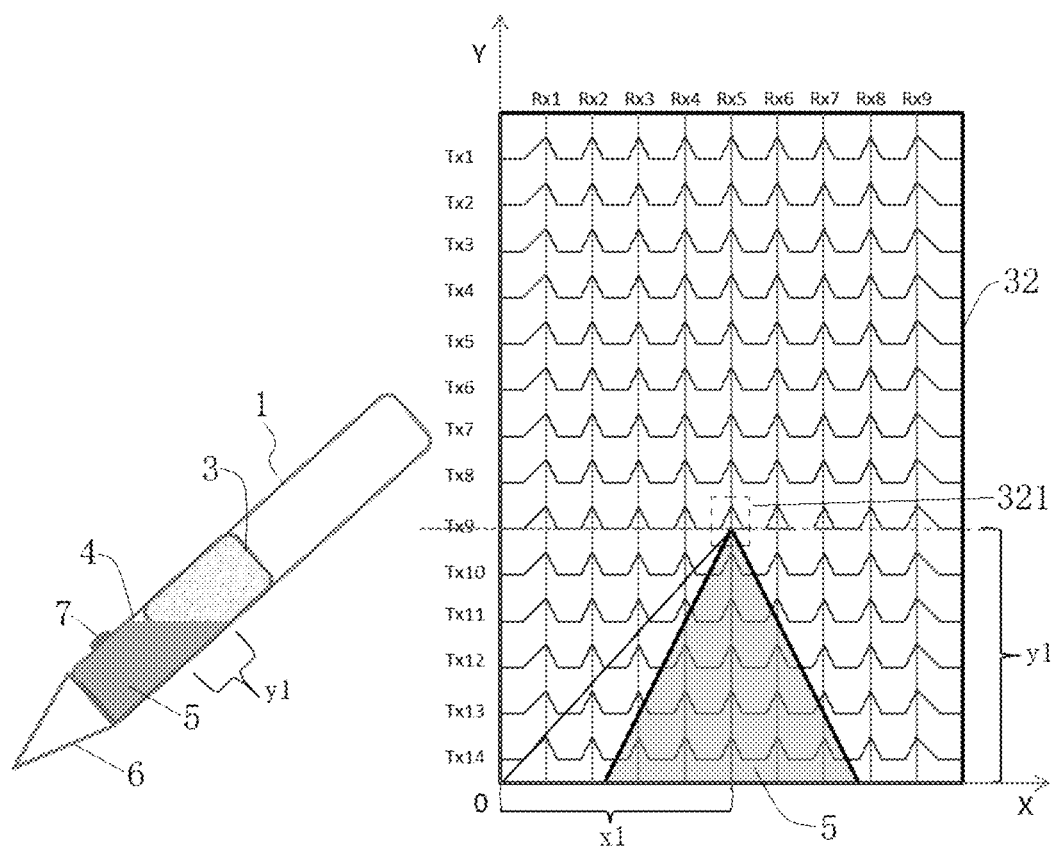
FIG. 4 is a schematic diagram showing a touch pen in an inclined state and a touch sensing circuit provided by some embodiments of the present disclosure.

In FIG. 3 and FIG. 4, the plurality of sensing units 321 is arranged in a matrix, and a coordinate system is established on the touch sensor 32. The coordinate system includes an origin O, X axis, and Y axis. The origin O is near the accommodation part 4. Each sensing unit 321 has a coordinate located in the coordinate system. The position information of each sensing unit 321 can be expressed by coordinates. The abscissa of each sensing unit 321 is measured by a line segment parallel to the X axis, and the ordinate of each sensing unit 321 is measured by a line segment parallel to the Y axis.

Optionally, the Y axis is parallel or substantially parallel to the axial direction of the pen body 1, and the touch sensor 32 is adjacent to the accommodation part 4 in the direction of the Y axis. The farthest sensing unit 321 contacted by the fluid 5 refers to the sensing unit 321 with the largest ordinate. The greater the inclined angle of the touch pen is, the greater the ordinate of the farthest sensing unit 321 contacted by the fluid 5 is.

The flow of fluid 5 may be affected by environmental factors such as vibration, which may have an impact on the accuracy of the inclined angle of the touch pen calculated by using the furthest sensing unit that the fluid contacts, and in view of this, a shock absorber or a buffer may be provided in the touch pen to reduce the adverse effect of environment disturbance. Optionally, the position information of the sensing units contacted by the fluid 5 may be denoised, or unreasonable position information may be removed, and position information of multiple sensing units may be used to more accurately simulate a farthest contact position of a sensing unit.

As shown in FIG. 4, when the touch pen is in an inclined posture with an inclination angle of θ, the coordinate of the farthest sensing unit 321 that the fluid 5 contacts is (x1, y1), and the touch sensor 32 outputs a corresponding current.

The touch detection sub-circuit 31 determines the coordinate of the farthest sensing unit 321 contacted by the fluid 5 as (x1, y1) based on the corresponding current outputted by the touch sensor 32, and outputs the corresponding reference value to the first controller 2 according to a position signal representing by the coordinate (x1, y1).

In an embodiment of the present disclosure, as shown in FIG. 3, the touch sensor 32 includes input data lines (Tx1 to Tx14) and output data lines (Rx1 to Rx9). The input data lines and the output data lines are intersected, and each sensing unit 321 is located at an intersection of one input data line and one output data line.

Optionally, each of the input data lines is coupled to sensing units located in the same row, and each of the output data lines is coupled to sensing units located in the same column, where a column direction is parallel to the central axis of the pen body.

Optionally, the number of input data lines and a distance between two adjacent input data lines can be determined according to actual design needs.

Optionally, the number of output data lines and a distance between two adjacent output data lines can be determined according to actual design needs.

In FIG. 3, the touch sensor 32 is provided with 14 input data lines Tx1 to Tx14 and 9 output data lines Rx1 to Rx9 to form 126 sensing units 321, and the 126 sensing units 321 are arranged in an array.

In another example, the touch sensor 32 may also be provided with 14 input data lines Tx1 to Tx14 and only one output data line Rx1 to form 14 sensing units 321, the 14 sensing units 321 are arranged at intervals in a direction parallel to the output data line Rx1.

Two layout methods of the input data lines and the output data lines are listed above. The input data lines and the output data lines may also adopt other layout methods, which are not repeated herein.

Optionally, in the touch pen, the touch sensing circuit 3 and the accommodation part 4 may be an integral structure formed with the pen body 1 or may be separate components.

In some optional embodiments of the present disclosure, a hollow groove is axially arranged inside the pen body, the accommodation part and the touch sensing circuit are in the hollow groove, and the accommodation part is located on a side of the touch sensing circuit close to a pen tip part of the pen body. The touch sensor is of a tubular shape, the accommodation part comprises an accommodation cavity, and the touch sensor and the accommodation cavity are coaxial with the hollow groove.

In some optional embodiments of the present disclosure, the accommodation cavity is a part of the hollow groove of the pen body. That is, the accommodation part is integrally integrated on the pen body.

Figure 5:
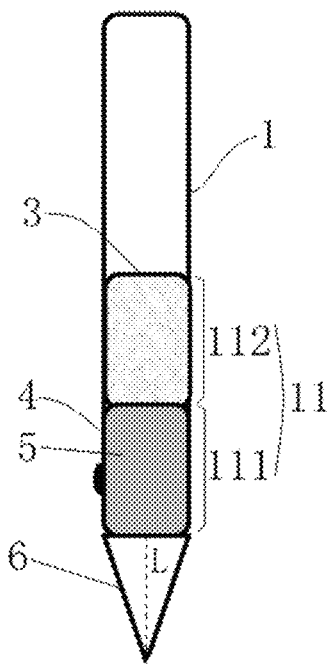
FIG. 5 is a schematic structural diagram of a touch pen provided by some embodiments of the present disclosure.

In an embodiment of the present disclosure, as shown in FIG. 5, the touch sensing circuit 3 and the accommodation part 4 are parts that are integrally formed with the pen body 1. The pen body 1 has a hollow groove 11 provided in the axial direction. The hollow groove 11 is divided, in the axial direction, into a first region 111 and a second region 112 adjacent to each other. The first region 111 is close to the pen tip part 6 of the pen body 1. The accommodation part 4 includes the first region 111, and the touch sensing circuit 3 includes the second region 112. The touch sensor 32 is of a tubular shape, is coaxial with the hollow groove 11, and is within the second region 112.

In some optional embodiments of the present disclosure, the touch pen further includes a tubular member arranged inside the pen body or on an outer surface of the pen body; the accommodation part and the touch sensing circuit are in the tubular member, and the accommodation part is located on a side of the touch sensing circuit close to a pen tip part of the pen body; and the touch sensor is of a tubular shape, the accommodation part comprises an accommodation cavity, and the touch sensor and the accommodation cavity are coaxial with the tubular member.

In some optional embodiments of the present disclosure, the accommodation part is a part of the tubular member. That is, the accommodation part is integrated on the pen body.

Figure 6:
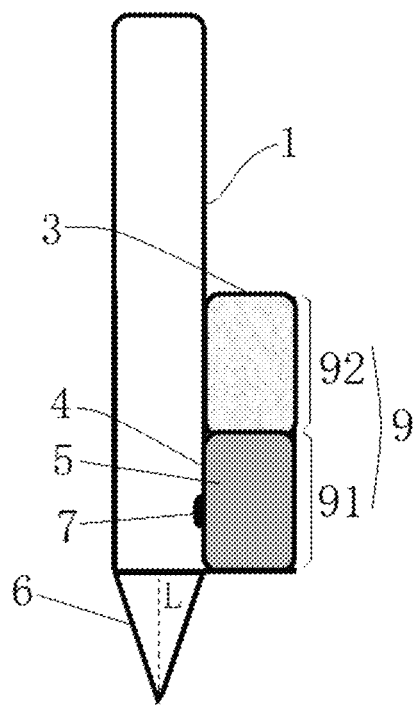
FIG. 6 is a schematic structural diagram of a touch pen provided by some embodiments of the present disclosure.

In an embodiment of the present disclosure, as shown in FIG. 6, the touch sensing circuit 3 and the accommodation part 4 are integrally formed components and are independent of the pen body 1. The touch pen includes a tubular member 9 provided inside or on the surface of the pen body 1. In FIG. 6, the tubular member 9 is provided on the surface of the pen body 1.

The tubular member 9 is divided into a first portion 91 and a second portion 92 in its axial direction, which are adjacent, and the first portion 91 is close to the pen tip part 6 of the pen body 1. The accommodation part 4 includes the first portion 91, and the touch sensing circuit 3 includes the second portion 92. The touch sensor 32 is of a cylindrical shape, and is coaxial with the tubular member 9 and is disposed in the second portion 92.

Figure 7:
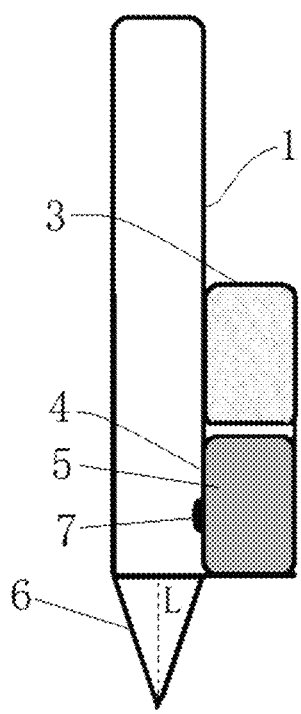
FIG. 7 is a schematic structural diagram of a touch pen provided by some embodiments of the present disclosure.

In an embodiment of the present disclosure, as shown in FIG. 7, the touch sensing circuit 3 and the accommodation part 4 are both separate components from the pen body 1. The accommodation part 4 includes a first cavity for accommodating the fluid 5, the touch sensing circuit 3 includes a second cavity, and the first cavity is in communication with the second cavity. The plurality of sensing units in the touch sensing circuit 3 is evenly arranged on an inner side wall of the second cavity.

It should be noted that the gap between the touch sensing circuit and the accommodation part 4 in FIG. 7 is to distinguish between the touch sensing circuit 3 and the accommodation part 4, and indicates that the touch sensing circuit 3 and the accommodation part 4 are independent components. In an actual product, there is no gap between the touch sensing circuit 3 and the accommodation part 4, or, the touch sensing circuit 3 and the accommodation part 4 are communicating with each other through an additional structure (for example, a tube).

Optionally, the touch sensor 32 may be designed in the form of a flexible printed circuit (FPC), and the touch sensor 32 is curled to form a cylindrical shape. The touch sensor 32 shown in FIG. 3 and FIG. 4 can be regarded as a state where the cylindrical touch sensor 32 is unfolded.

The touch sensor 32 is curled into a cylindrical shape, and when the touch pen is inclined in any direction, it can be ensured that the fluid 5 can be in contact with the touch sensor 32, which is convenient for the user to use.

Optionally, the touch detection sub-circuit 31 may be designed as a flexible circuit board.

Optionally, the touch detection sub-circuit 31 and the first controller 2 may be integrated on a circuit board or chip.

In some optional embodiments of the present disclosure, the first controller may be a processor, a control circuit, or an integrated chip.

Figure 8:
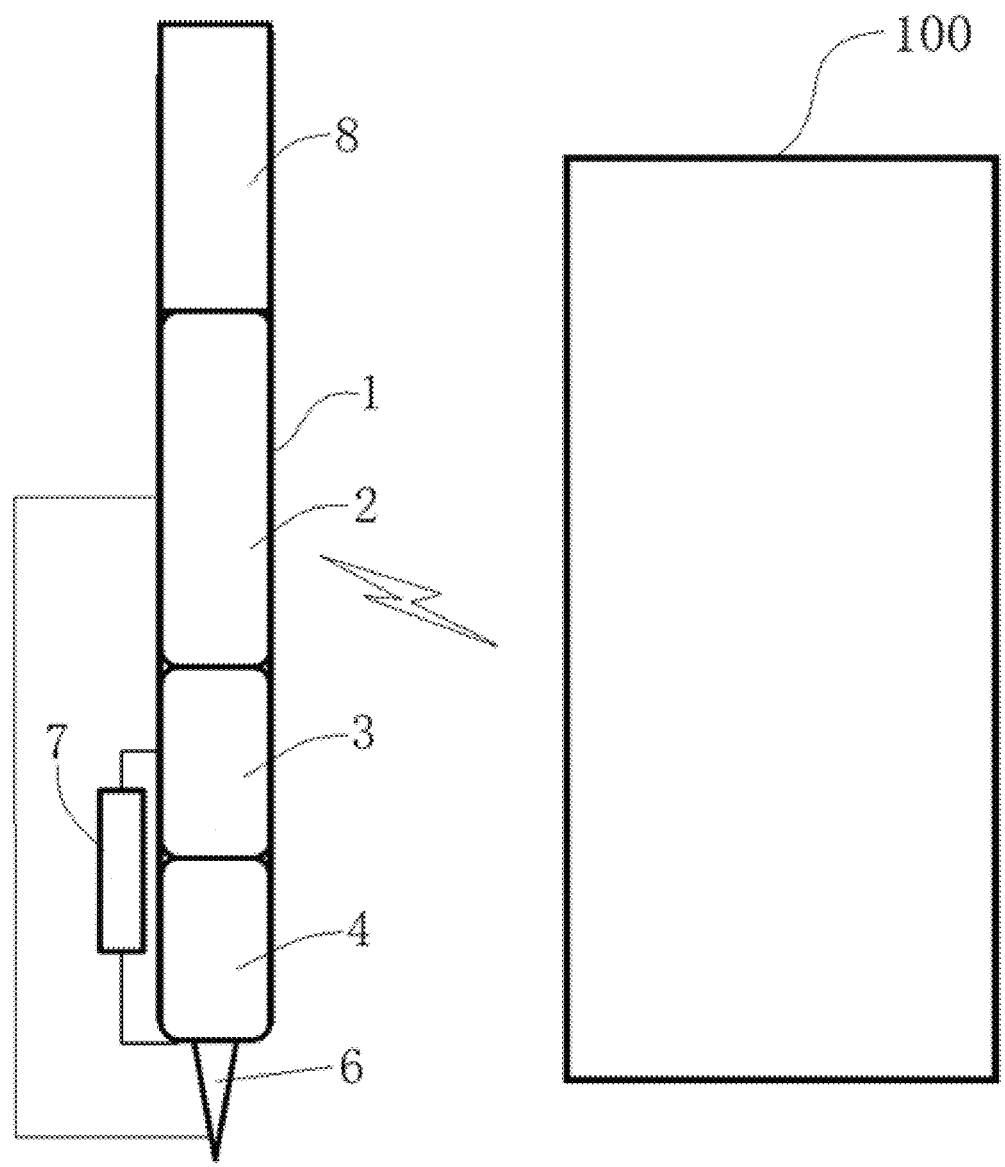
FIG. 8 is a schematic structural diagram of a touch control device provided by some embodiments of the present disclosure.

Optionally, as shown in FIG. 8, the first controller 2 is configured to output a control signal according to the reference value, which may be used to control the first device 100. A user can control the first device 100 to output a corresponding result by changing the inclined angle of the touch pen. Application scenarios of the touch pen are illustrated hereinafter.

In an optional embodiment of the present disclosure, the first controller 2 is coupled to the pen tip part 6 of the pen body 1 for transmitting an excitation signal with a first frequency to a screen of the first device 100 through the pen tip part 6 according to the received reference value. Specifically, the excitation signal may be an alternating current excitation signal.

The relationship between the inclined angle of the pen body 1 and the excitation signal can be determined according to actual design demands. Specifically, the value of the first frequency may be determined according to actual design demands.

Figure 9:
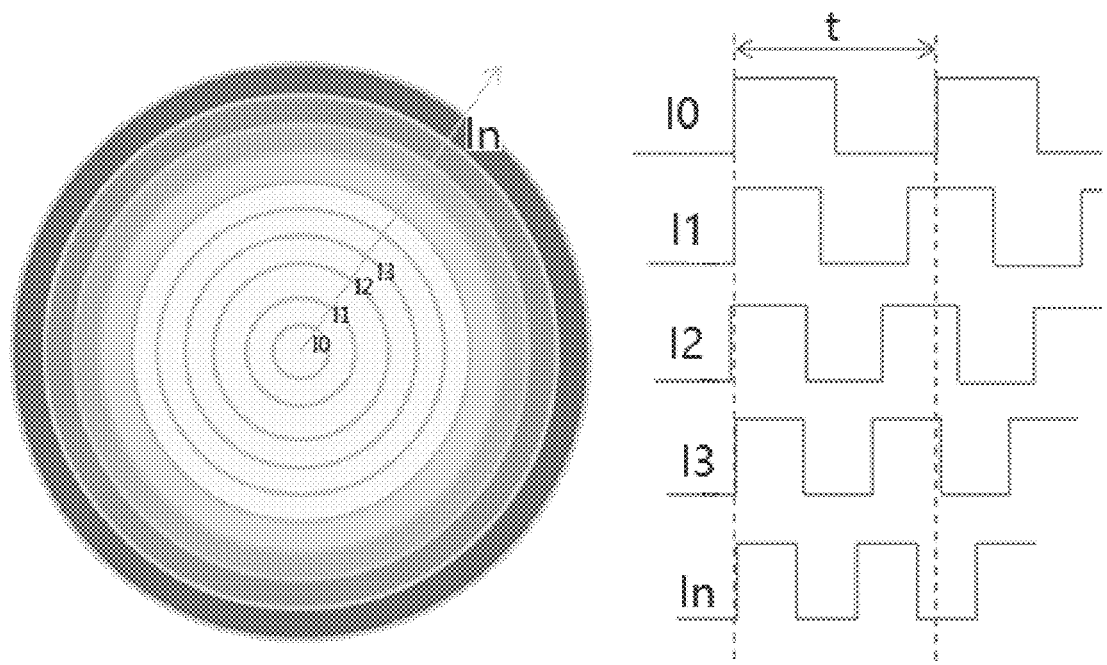
FIG. 9 is a schematic diagram showing a relationship between a current in a circuit and a frequency of an excitation signal outputted by a first controller provided by some embodiments of the present disclosure.

FIG. 9 shows a relationship between a current in a circuit and a frequency of an excitation signal outputted by the first controller 2. In FIG. 9, I0 to In represent currents generated in each circuit as the inclined angle of the pen body 1 increases. The larger the radius of the circle in FIG. 9 is, the larger the current value is. Each current corresponds to a waveform, and the waveform can reflect the frequency of the excitation signal outputted by the first controller 2. A person of ordinary skill in the art can understand that, within a unit of time t, the larger the quantity of waveform transformations is, the higher the frequency of the excitation signal is.

Taking the relationship shown in FIG. 9 as an example, the larger the inclined angle of the pen body 1 is, the larger the value of the current generated by the circuit is, and the larger the reference value outputted by the circuit is. The larger the reference value is, the higher the frequency of the excitation signal outputted by the first controller 2 is, that is, the frequency of the excitation signal has a positive correlation with the reference value. Alternatively, the larger the reference value is, the lower the frequency of the excitation signal outputted by the first controller 2 is, that is, the frequency of the excitation signal has a negative correlation with the reference value. When the touch pen is in a writing mode, the thickness of the line displayed on the screen of the first device 100 may be related to the frequency of the received excitation signal. In some optional embodiments, the higher the frequency of the excitation signal received by the screen is, the thicker the line displayed on the screen is. Alternatively, the higher the frequency of the excitation signal received by the screen is, the thinner the line displayed on the screen is.

When a user uses the touch pen provided in the embodiments of the present disclosure to write on the screen of the first device 100, the thickness of the line displayed on the screen may be changed by changing the inclined angle of the touch pen.

In some embodiments of the present disclosure, the first controller 2 is configured to be in communication connection with a first communication module (for example, may be a communication circuit) of the first device 100, and transmit the control signal to the first communication module according to the received reference value, so that the first device 100 is enabled to perform a corresponding operation according to the control signal.

In some optional embodiments, the first controller 2 and the first communication module may be in a wired communication connection or a wireless communication connection.

In some optional embodiments, the first controller 2 transmits a control signal for screen brightness to the first communication module according to the received reference value. For example, the larger the inclined angle of the touch pen is, the lower the brightness of the screen is. Alternatively, the larger the inclined angle of the touch pen is, the higher the brightness of the screen is.

In some optional embodiments, the first controller 2 transmits a control signal for volume to the first communication module according to the received reference value. For example, the larger the inclined angle of the touch pen is, the higher the volume output by the first device 100 is. Alternatively, the larger the inclined angle of the touch pen is, the lower the volume outputted by the first device 100 is.

In some optional embodiments, the first controller 2 transmits a control signal for vibration to the first communication module according to the received reference value. For example, the larger the inclined angle of the touch pen is, the larger the vibration of the first device 100 is. Alternatively, the larger the tilt angle of the touch pen is, the smaller the vibration of the first device 100 is.

In some optional embodiments, the first controller 2 transmits a control signal for cursor to the first communication module according to the received reference value. For example, by changing the inclined angle of the touch pen, the position of the cursor displayed on the screen is changed.

It should be noted that only part of the application scenarios of the touch pen are listed above. The touch pen may also be applied in more scenarios, which are not described herein.

In some optional embodiments of the present disclosure, as shown in FIG. 1, the touch pen further includes a button 7. The button 7 is configured to set an operating mode of the touch pen (such as setting a writing mode).

In some optional embodiments of the present disclosure, as shown in FIG. 1, the touch pen further includes a power supply part (for example, battery) 8. The power supply part 8 is coupled to the first controller 2 and the touch sensing circuit 3 and is configured to supply power for the first controller 2 and the touch sensing circuit 3.

Based on the same inventive concept, as shown in FIG. 9, some embodiments of the present disclosure further provide a touch control device, which includes a first device 100 and the touch pen provided in the above embodiments of the present disclosure. The first device is configured to receive the control signal outputted from the first controller 2 of the touch pen.

In some optional embodiments, the first device is configured to: control, according to the control signal, a thickness of a line displayed on a screen, a brightness of a screen, an output volume of the first device, a position of a cursor displayed on a screen, or a vibration degree of the first device.

The touch control device provided by the embodiments of the present disclosure has the same inventive concept and the same beneficial effects as the above embodiments. For the content not shown in detail in the touch control device, reference may be made to the above embodiments, which is not repeated herein.

Figure 10:
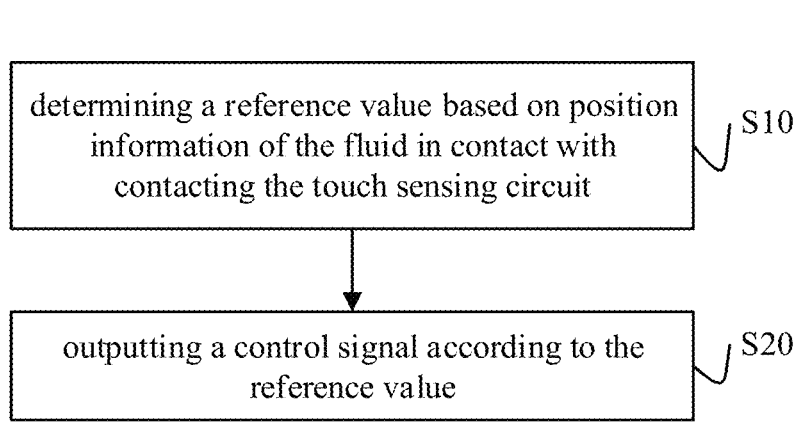
FIG. 10 is a schematic flowchart of a method for controlling a touch pen provided by some embodiments of the present disclosure.

Based on the same inventive concept, some embodiments of the present disclosure further provide a method for controlling a touch pen. The method is applied to the touch pen provided by the foregoing embodiments of the present disclosure. A schematic flowchart of the method is shown in FIG. 10, which includes steps S10 and S20.

Step S10 includes: determining a reference value based on position information of the fluid in contact with the touch sensing circuit.

When the touch pen is inclined, the fluid 5 in the accommodation part 4 may flow into the touch sensing circuit 3, and the touch sensing circuit 3 may output a corresponding reference value according to the position information of the fluid 5 in contact with the touch sensing circuit 3. When the touch pen is in a different inclined posture, the amount of the fluid 5 flowing into the touch sensing circuit 3 may change, so that the position information of the touch sensing circuit 3 in contact with the fluid 5 and the reference value outputted by the touch sensing circuit 3 may also change accordingly. Since the first controller 2 can output corresponding signals according to different reference values, the first controller 2 of the touch pen can change the outputted signal with the only need of the user to change the inclined posture of the touch pen, thereby realizing related control functions. The touch sensing circuit 3 of the touch pen replaces the pressure sensor and the Bluetooth module of touch pens in the related technology. The touch pen in the embodiments of the present disclosure has a simpler structure and a faster response speed, which saves the cost and reduces power consumption.

Taking FIG. 2 as an example, the touch pen is in a vertical state at position A, the inclined angle is 0, and the touch sensing circuit 3 is not in contact with the fluid 5. The touch pen is inclined rightwards from position A to position B, in this case, the touch pen is in an inclined posture with an inclined angle of θ, and a part of the touch sensing circuit 3 is in contact with the fluid 5 to output a corresponding reference value.

It should be noted that both the dotted line L and the dotted line L' in FIG. 2 represent the central axis of the pen body 1. In the embodiments of the present disclosure, the inclined angle of the touch pen at the current position refers to an angle between the central axis L' of the touch pen at the current position and the central axis L of the touch pen at position A. For example, the inclined angle θ is the angle between the central axis L' of the touch pen at position B and the central axis L of the touch pen at position A.

When the touch pen is inclined rightwards from position A to position B, a position of the touch sensing circuit 3 in contact with the fluid 5 may change at least once, and each position corresponds to one reference value.

Step S20 includes: outputting a control signal according to the reference value.

Optionally, as shown in FIG. 8, the first controller 2 outputs a control signal according to the reference value, which may be used to control the first device 100. The user can control the first device 100 to output a corresponding result by changing the inclined angle of the touch pen. Application scenarios of the touch pen are described as followings.

In an optional embodiment of the present disclosure, the first controller 2 is coupled to the pen tip part 6 of the pen body 1 for transmitting an excitation signal with a first frequency to a screen of the first device 100 through the pen tip part 6 according to the received reference value. Specifically, the excitation signal may be an alternating current excitation signal.

The relationship between the inclined angle of the pen body 1 and the excitation signal can be determined according to actual design demands.

FIG. 9 shows a relationship between a current in a circuit and a frequency of an excitation signal outputted by the first controller 2. In FIG. 9, I0 to In represent currents generated in each circuit as the inclined angle of the pen body 1 increases. The larger the radius of the circle in FIG. 9 is, the larger the current value is. Each current corresponds to a waveform, and the waveform can reflect the frequency of the excitation signal outputted by the first controller 2. A person of ordinary skills in the art can understand that, within a unit of time t, the larger the quantity of waveform transformations is, the higher the frequency of the excitation signal is.

Taking the relationship shown in FIG. 9 as an example, the larger the inclined angle of the pen body 1 is, the larger the value of the current generated by the circuit is, and the larger the reference value outputted by the circuit is. The larger the reference value is, the higher the frequency of the excitation signal outputted by the first controller 2 is, that is, the frequency of the excitation signal has a positive correlation with the reference value.

When writing on the screen of the first device 100 using the touch pen provided by the embodiments of the present disclosure, a user can change the thickness of the line displayed on the screen by changing the inclined angle of the touch pen.

In some optional embodiments, the first controller 2 is communicatively coupled to the first communication circuit of the first device 100. The first controller 2 transmits a control signal to the first communication circuit according to the received reference value, so that the first device 100 performs a corresponding operation according to the control signal.

In some optional embodiments, the first controller 2 and the first communication module may be in a wired communication connection or a wireless communication connection.

In some optional embodiments, the first controller 2 transmits a control signal for screen brightness to the first communication module according to the received reference value. For example, the larger the inclined angle of the touch pen is, the lower the brightness of the screen is. Alternatively, the larger the inclined angle of the touch pen is, the higher the brightness of the screen is.

In some optional embodiments, the first controller 2 transmits a volume control signal to the first communication module according to the received reference value. For example, the larger the inclined angle of the touch pen, the higher the volume output by the first device 100. Alternatively, the greater the inclined angle of the touch pen, the lower the volume output by the first device 100.

In some optional embodiments, the first controller 2 transmits a control signal for cursor to the first communication module according to the received reference value. For example, by changing the inclined angle of the touch pen, the position of the cursor displayed on the screen is changed.

In some optional embodiments, the first controller 2 transmits a control signal for vibration to the first communication module according to the received reference value. For example, the larger the inclined angle of the touch pen is, the larger the vibration of the first device 100 is. Alternatively, the larger the tilt angle of the touch pen is, the smaller the vibration of the first device 100 is.

It should be noted that only part of the application scenarios of the touch pen are listed above. The touch pen may also be applied in more scenarios, which are not described herein.

Based on the same inventive concept, some embodiments of the present disclosure further provide a readable storage medium. A computer program is stored on the readable storage medium, and the computer program is executed by a touch pen to implement the method for controlling the touch pen provided by the above-described embodiments of the present disclosure.

The computer readable medium includes, but is not limited to, any type of disk (including floppy disk, hard disk, optical disk, CD-ROM, and magneto-optical disk), ROM, RAM, and EPROM (Erasable Programmable Read-Only Memory), EEPROM, flash memory, magnetic or optical card. That is, the readable medium includes any medium that stores or transfers information in a readable form by a device (e.g., a computer).

The readable storage medium provided by the embodiments of the present disclosure has the same inventive concept and the same beneficial effects as the foregoing embodiments. For the content not shown in detail in the readable storage medium, reference may be made to the foregoing implementations, which is not repeated herein.

By adopting the embodiments of the present disclosure, at least the following beneficial effects can be achieved.

First, when the touch pen is inclined, the fluid in the accommodation part may flow into the touch sensing circuit, and the touch sensing circuit can output a corresponding reference value according to the position information of the fluid in contact with the touch sensing circuit. When the touch pen is in a different inclined posture, the amount of the fluid flowing into the touch sensing circuit may change, so that the position information of the touch sensing circuit in contact with the fluid and the reference value outputted by the touch sensing circuit may also change accordingly. Since the first controller can output corresponding signals according to different reference values, the first controller of the touch pen can change the outputted signal only when the user changes the inclined posture of the touch pen, thereby realizing related control functions. The touch sensing circuit of the touch pen replaces the pressure sensor and the Bluetooth module of touch pens in the related technology. The touch pen in the embodiments of the present disclosure has a simpler structure and a faster response speed, which not only saves costs but also reduces power consumption.

Second, the touch sensor is curled into a tube shape, and it can be ensured that the fluid can contact the touch sensor when the touch pen is inclined in any direction, which is convenient for the user to use.

A person of ordinary skill in the art can understand that steps, measures, or solutions in various operations, methods or processes that have been discussed in the present disclosure can be alternated, changed, combined, or deleted. Further, other steps, measures, or solutions in various operations, methods or processes that have been discussed in the present disclosure can be alternated, modified, rearranged, decomposed, combined, or deleted. Further, steps, measures, or solutions in various operations, methods or processes in the related technologies can be alternated, modified, rearranged, decomposed, combined, or deleted.

In the descriptions of the present disclosure, it needs to be understood that orientation or positional relationship indicated by terms such as "center", "up", "down", "front", "rear", "left", "right", "vertical", "horizontal", "top", "bottom", "inside", or "outer" is based on the drawings, and are only for the convenience of describing the present disclosure and simplifying the description, and not intended to indicate or imply that the device or element as referred to must have a specific orientation or be constructed and operated in a specific orientation, and therefore cannot be understood as a limitation to the present disclosure.

The terms such as "first" and "second" are used for descriptive purposes only, and cannot be understood as indicating or implying relative importance or implicitly indicating the quantity of technical features as referred to. Therefore, the features defined by "first" and "second" may explicitly or implicitly include one or more of the features. In the descriptions of the present disclosure, unless otherwise stated, terms such as "a plurality" and "multiple" means two or more.

In the description of the present disclosure, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present disclosure may be understood on a case-by-case basis.

In the descriptions of this specification, specific features, structures, materials, or characteristics may be combined in a suitable manner in any one or more embodiments or examples.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they may be performed in other orders. Moreover, at least a part of the steps in the flowchart of the drawings may include multiple sub-steps or multiple stages. These sub-steps or stages are not necessarily performed at the same time, but may be performed at different times; and they are not necessarily performed sequentially, but may be performed in turn or alternately with other steps or at least a part of sub-steps or stages of other steps.

The above descriptions are merely some embodiments of the present disclosure. It should be noted that for those of ordinary skill in the art, various improvements and polishments can be made without departing from the principles of the present disclosure. These improvements and polishments should fall within the protection scope of the present disclosure.

What is claimed is:

1. A touch pen, comprising:
   a pen body; and
   a first controller, a touch sensing circuit and an accommodation part that are arranged on the pen body, wherein:
   the accommodation part is configured to accommodate a fluid and is coupled to the touch sensing circuit;
   the touch sensing circuit is configured to contact the fluid in the accommodation part in a case that the pen body is in an inclined posture, detect position information of the fluid in contact with the touch sensing circuit and determine a corresponding reference value based on the position information;
   the first controller is coupled to the touch sensing circuit, and is configured to output a control signal according to the reference value;
   the touch sensing circuit comprises a touch detection sub-circuit and a touch sensor;
   the touch sensor is configured to contact the fluid in the accommodation part in a case that the pen body is in an inclined posture;
   the touch detection sub-circuit is configured to detect the position information of the touch sensor in contact with the fluid and determine the corresponding reference value based on the position information;
   the touch sensor comprises a plurality of sensing units arranged in an array; and
   the touch detection sub-circuit is coupled to each of the plurality of sensing units, and is configured to detect position coordinates of sensing units in contact with the fluid.

2. The touch pen according to claim 1, wherein the touch detection sub-circuit is configured to determine, from the sensing units in contact with the fluid, a target sensing unit farthest from the accommodation part, and determine the corresponding reference value based on the position information of the target sensing unit.

3. The touch pen according to claim 1, and wherein the touch sensor comprises a plurality of input data lines and a plurality of output data lines, each of the plurality of input data lines is coupled to sensing units in one row, and each of the plurality of output data lines is coupled to sensing units in one column, wherein a column direction is parallel to a central axis of the pen body.

4. The touch pen according to claim 1, wherein:
   a hollow groove is axially arranged inside the pen body, the accommodation part and the touch sensing circuit are in the hollow groove, and the accommodation part is located on a side of the touch sensing circuit close to a pen tip part of the pen body; and
   the touch sensor is of a tubular shape, the accommodation part comprises an accommodation cavity, and the touch sensor and the accommodation cavity are coaxial with the hollow groove.

5. The touch pen according to claim 1, further comprising a tubular member arranged inside the pen body or on an outer surface of the pen body; wherein:
   the accommodation part and the touch sensing circuit are in the tubular member, and the accommodation part is located on a side of the touch sensing circuit close to a pen tip part of the pen body; and
   the touch sensor is of a tubular shape, the accommodation part comprises an accommodation cavity, and the touch sensor and the accommodation cavity are coaxial with the tubular member.

6. The touch pen according to claim 1, wherein:
   the accommodation part is provided with a first cavity for accommodating the fluid; and
   the touch sensing circuit is provided with a second cavity, the plurality of sensing units of the touch sensor is evenly arranged on an inner side wall of the second cavity to form a tubular shape, and the first cavity is in communication with the second cavity.

7. The touch pen according to claim 1, wherein the touch detection sub-circuit and the first controller are integrated on one circuit board or one chip.

8. The touch pen according to claim 1, wherein the first controller is coupled to a pen tip part of the pen body, and is configured to transmit, to a first device via the pen tip part, an excitation signal with a first frequency according to the reference value.

9. The touch pen according to claim 8, wherein the first frequency and the reference value are in a positive correlation relationship or a negative correlation relationship.

10. The touch pen according to claim 1, wherein the first controller is configured to transmit the control signal to a first communication circuit of a first device according to the reference value, to cause the first device to perform a corresponding operation according to the control signal.

11. A method for controlling a touch pen, applied to the touch pen according to claim 1, comprising:
   determining a reference value based on position information of the fluid in contact with the touch sensing circuit; and
   outputting a control signal according to the reference value.

12. The method according to claim 11, wherein the outputting the control signal according to the reference value comprises at least one of:
   transmitting an excitation signal with a first frequency to a screen of a first device via a pen tip part according to the reference value; and
   transmitting the control signal to a first communication circuit of the first device according to the reference value, so that the first device performs a corresponding operation according to the control signal.

13. A non-transitory readable storage medium, having a program stored thereon, wherein the program is executed by the touch pen to implement the method for controlling the touch pen according to claim 11.

14. A touch pen, comprising:
   a pen body; and
   a first controller, a touch sensing circuit and an accommodation part that are arranged on the pen body,
   wherein:
      the accommodation part is configured to accommodate a fluid and is coupled to the touch sensing circuit;
      the touch sensing circuit is configured to contact the fluid in the accommodation part in a case that the pen body is in an inclined posture, detect position information of the fluid in contact with the touch sensing circuit and determine a corresponding reference value based on the position information;
      the first controller is coupled to the touch sensing circuit, and is configured to output a control signal according to the reference value;
      the touch sensing circuit comprises a touch detection sub-circuit and a touch sensor;
      the touch sensor is configured contact the fluid in the accommodation part in a case that the pen body is in an inclined posture;
      the touch detection sub-circuit is configured to detect the position information of the touch sensor in contact with the fluid and determine the corresponding reference value based on the position information;
      a hollow groove is axially arranged inside the pen body, the accommodation part and the touch sensing circuit are in the hollow groove, and the accommodation part is located on a side of the touch sensing circuit close to a pen tip part of the pen body; and
      the touch sensor is of a tubular shape, the accommodation part comprises an accommodation cavity, and the touch sensor and the accommodation cavity are coaxial with the hollow groove.

15. A touch control device, comprising a first device and a touch pen, wherein the touch pen comprises:
   a pen body; and
   a first controller, a touch sensing circuit and an accommodation part that are arranged on the pen body,
   wherein:
      the accommodation part is configured to accommodate a fluid, and is coupled to the touch sensing circuit;
      the touch sensing circuit is configured to contact the fluid in the accommodation part in a case that the pen body is in an inclined posture, detect position information of the fluid in contact with the touch sensing circuit and determine a corresponding reference value based on the position information;
      the first controller is coupled to the touch sensing circuit, and is configured to output a control signal according to the reference value;
      the touch sensing circuit comprises a touch detection sub-circuit and a touch sensor:
      the touch sensor is configured to contact the fluid in the accommodation part in a case that the pen body is in an inclined posture;
      the touch detection sub-circuit is configured to detect the position information of the touch sensor in contact with the fluid and determine the corresponding reference value based on the position information;
      the touch sensor comprises a plurality of sensing units arranged in an array;
      the touch detection sub-circuit is coupled to each of the plurality of sensing units, and is configured to detect position coordinates of sensing units in contact with the fluid; and
      the first device is configured to receive the control signal outputted by the first controller of the touch pen.

16. The touch control device according to claim 15, wherein the first device is configured to: control, according to the control signal, a thickness of a line displayed on a screen, a brightness of a screen, an output volume of the first device, a position of a cursor displayed on a screen, or a vibration degree of the first device.

17. The touch control device according to claim 15, wherein the touch detection sub-circuit is configured to determine, from the sensing units in contact with the fluid, a target sensing unit farthest from the accommodation part, and determine the reference value based on a position coordinate of the target sensing unit in the plurality of sensing units.

* * * * *